United States Patent
Ciminelli Duarte De Souza (10) Patent No.: US 9,759,324 B2
(45) Date of Patent: Sep. 12, 2017

(54) PISTON RING

(71) Applicants: Mahle Metal Leve S/A, Jundiai (BR);
Mahle International GmbH, Stuttgart (DE)

(72) Inventor: Mauricio Ciminelli Duarte De Souza, Minas Gerais (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 17 days.

(21) Appl. No.: 15/101,339

(22) PCT Filed: Dec. 3, 2014

(86) PCT No.: PCT/EP2014/076401
§ 371 (c)(1),
(2) Date: Jun. 2, 2016

(87) PCT Pub. No.: WO2015/082538
PCT Pub. Date: Jun. 11, 2015

(65) Prior Publication Data
US 2016/0298764 A1 Oct. 13, 2016

(30) Foreign Application Priority Data
Dec. 3, 2013 (BR) .............................. 102013031138

(51) Int. Cl.
*F16J 9/00* (2006.01)
*F16J 9/26* (2006.01)

(52) U.S. Cl.
CPC ...................................... *F16J 9/26* (2013.01)

(58) Field of Classification Search
CPC ...................................... F16J 9/00; F16J 9/26
See application file for complete search history.

(56) References Cited

U.S. PATENT DOCUMENTS

2014/0353923 A1\* 12/2014 Lammers ............ C23C 14/0641
277/443

FOREIGN PATENT DOCUMENTS

| EP | 1359351 A1 | 11/2003 |
|---|---|---|
| JP | 2008-297477 | 12/2008 |
| WO | WO-2013104784 A2 | 7/2013 |

\* cited by examiner

*Primary Examiner* — Gilbert Lee
(74) *Attorney, Agent, or Firm* — Fishman Stewart PLLC (57) ABSTRACT

A piston ring for an internal combustion engine may include a metal base and a protective coating disposed on the base to cover at least part of a surface of the base. The coating may be composed of at least one nitride phase formed from at least one metal element and aluminum, and the coating may have an internal stress of less than 1.2 GPa.

21 Claims, 6 Drawing Sheets

PISTON RING

CROSS-REFERENCE TO RELATED APPLICATIONS

This application claims priority to Brazilian Patent Application No. 10 2013 031138 3, filed Dec. 3, 2013, and International Patent Application No. PCT/EP2014/076401, filed Dec. 3, 2014, both of which are hereby incorporated by reference in their entirety.

TECHNICAL FIELD

The present invention relates to a piston ring having a coating comprising a nitride (metal element+nitrogen (N)) and at least one additional metal element selected from group IIIA of the periodic table.

The piston ring thus obtained demonstrates excellent properties in relation to wear resistance and fragmentation resistance, whilst maintaining an excellent level of abrasion resistance due to a low level of internal stress and a low number of macroparticles per square millimeter of the average cross-sectional area of the coating.

BACKGROUND

The use of a film of chromium nitride (CrN and/or $Cr_2N$) on the external peripheral surface of a sliding member of an internal combustion engine, such as a piston ring, provides high wear resistance. This type of coating is widely used in components for recently developed engines wherein high thermal and mechanical loads are the rule during operation. Such coating is obtained by the physical deposition of metal vapour generated by a cathodic arc source.

However, in engines operating under extremely high load conditions and having a high combustion pressure level, such as those with a turbocompressor, this coating of CrN and/or $Cr_2N$ ceramic presents intrinsic fragility leading to the appearance of microfissures in the surface thereof. These microfissures propagate and the connection thereof leads to a loss of small pieces of the coating (a phenomenon called "fragmentation"), generating empty spaces in the surface thereof and, in some drastic cases, scratching of the engine liners. The lack of coating on some portions of the ring exposes the base metal which commences experiencing severe wear and then the performance of such a component diminishes rapidly.

A further large obstacle for the wide application of cathodic arc plasma deposition is the presence of macroparticles in the coating. These macroparticles induce defects in the coating which result in premature damage to the generally hard and corrosion-resistant coatings. The prejudicial effect of the formation of macroparticles includes the local loss of coating adhesion, surface corrugation and surface contraction formation due to a macroparticle autorepulsion mechanism, none of which are relieved by tribological applications.

Another type of coating composed of coatings of doped TiN is used in dry cutting operations, by virtue of its high oxidation temperature and abrasive wear resistance. However, as may be observed for the chromium ceramic coating, the presence of macroparticles due to the cathodic arc process endangers the corrosion and fragmentation resistance of this coating for piston ring applications.

There are various cases of patents belonging to the prior art revealing piston rings or other sliding members having a coating comprising a nitride (metal element+nitrogen (N)) and at least one additional metal element, however they disclose the same composition as the present invention and, as a consequence, have the same performance in relation to fragmentation resistance, wear resistance and degree of abrasion resistance as a function of the advantageous properties of a considerably reduced internal stress level and number of macroparticles per square millimeter of the average cross-sectional area of the coating.

British patent GB 2259715 discloses a piston ring having a surface coating of metal and metal carbide/nitride, together with the process for manufacturing the same.

The process patented uses an ion arc galvanising apparatus wherein a metal not having the capacity to form a carbide or nitride, such as cobalt, nickel or molybdenum, is defined as a first target, a metal having the capacity to form a carbide or a nitride, such as silicon, titanium, vanadium, chromium, iron, zirconium, niobium or tungsten, is defined as a second target, and nitrogen, acetylene or methane is fed as a process gas to form a film on a piston ring body, being an article to be coated, in this manner furnishing a piston ring comprising a hard film formed on at least one sliding external face of the body of the piston ring. Such hard film comprises a mixed structure formed by the metal not having the capacity to form a carbide or a nitride and a carbide or nitride of the metal having the capacity to form a carbide or nitride. On the piston ring of such an invention, the hard film has such good adhesion to the material of the body or film hardness that fissuring or detachment of the film does not tend to occur, even when there is formed a film having a great thickness. The carbide or nitride in the hard film contributes to the realisation of superior wear resistance. By virtue of the fine structure of the hard film, the wear of the opposing material may be reduced, there tends to be no loss of film lubrication and corrosion resistance may be improved. Subsequent to the hard film having been formed nitriding may be realised.

International patent application WO2008/152104 discloses a piston ring comprising a support material and a wear resistant coating composed of a ternary system A-B—N applied using a PVD process, wherein A and B in each case represent an element of the group comprising Ti, Zr, Hf, V, Nb, Ta, Cr, Mo, W, Al, Si and C, and N represents nitrogen. The thickness of the wear resistant coating is 3 microns.

U.S. Pat. No. 7,160,635 discloses nitrided coatings based on protective Ti—Al—Cr for the protection of substrates operating at moderately elevated temperatures. More particularly, the coatings were developed for the protection of aircraft titanium alloy and components of stationary gas turbines, together with engine components for automotive applications, articles having such coatings, and a method for the production thereof.

U.S. patent application No. 2009/0075114 discloses a method for the manufacture of a protective coating of a hard material on a substrate consisting of a metal or of an electrically conductive ceramic material, for example a tool coated for use in a machine tool or components exposed to high temperature wherein, prior to the deposition of the coating of the hard protective material, the substrate is pretreated by metal ion bombardment of at least one rare earth element, in this manner resulting in the implantation of some of said ions in the said substrate.

U.S. Pat. No. 5,154,433 discloses a piston ring comprising a martensitic stainless steel ring having a nitrided layer formed on a portion of the surface thereof and a titanium nitride coated on the external sliding surface of the ring by an ion galvanisation process. In one of the embodiments of this invention, the titanium nitride film has a nitrogen concentration which is gradually increased in the direction from the upper surface thereof downwards, a film hardness gradually increased in the direction towards the upper surface rendering a portion of the film surface more fragile than the other portion of the film. Furthermore, according to a second embodiment of the invention, the titanium nitride film has a nitrogen concentration which is gradually diminished in the direction towards the upper surface and has a film surface hardness of 1800 HV or less.

U.S. Pat. No. 5,316,321 discloses a non-ferrous piston ring having a hard surface treatment layer. More specifically, the ring is made from a titanium alloy and at least one external peripheral surface and the upper and lower surfaces thereof are formed by a diffused layer of nitrogen and at least one external peripheral sliding surface thereof is coated with a hard film by means of physical vapour deposition on the diffused nitrogen layer.

U.S. Pat. No. 6,372,369 discloses a hard film coating, a sliding member similar to a piston ring covered with a hard film and a method for the manufacture thereof.

In such an invention, a nitrided layer is formed on a piston ring and a hard film is formed by ion arc galvanisation on the nitrided layer on the external circumferential surface. The hard layer has a crystal structure comprising mixed phases of CrN and TiN and contains oxygen in solid solution state in the crystals of CrN and TiN. The hard film comprises chromium from 40 to 75 percent by weight, titanium from 10 to 40 percent by weight, oxygen from 0.5 to 15 per percent by weight, the balance being nitrogen. The crystal particle size lies within 1 μm. The Vickers hardness of the hard film lies in a range from 1300 to 2300. The crystals of CrN and TiN have a preferred surface orientation of (200) or a preferred surface orientation of (111) parallel to a surface which is covered and has a structure in columnar form, being in the form of a column from the base material in the direction of the film surface. Carbon in solid solution state may be contained instead of oxygen, and both the oxygen and carbon may be contained in solid solution state. An underfilm of CrN may be formed between the nitrided layer and the hard film.

U.S. Pat. No. 6,161,837 discloses a piston ring having a hybrid coated face together with a process for manufacturing the ring. A base body of annular steel has a lower layer formed by electrogalvanisation of a peripheral surface of the body with a chromium or titanium nitrided gas. The ring is normally bathed until coating, smoothing and removal of residual metal galvanisation nodules, which yield random microabrasions in the lower layer. An upper layer of metal nitride or chromium ceramic is formed on the lower bathed layer by means of the use of physical vapour deposition means.

U.S. patent application No. US2008/0260478 discloses a PVD coating and in particular a nanoscale multilayer superlattice PVD coating comprising high hardness, low coefficient of friction and increased chemical inertness. The multilayer coating comprises a repeating bilayer represented by $(V_xMe_{(i-x)})C_yN_{(i-y)}/(Me_zV_{(1-z)})C_yN_{(i-y)}$ wherein $0.1 \leq x \leq 0.9$, $0.01 < y < 0.99$ and $0.1 \leq z \leq 0.9$, and Me is a substantially pure metal or a metal alloy.

The composition of the coating through the layers alternates from layer to layer according to a modulated sequence of a V-rich layer and an Me-rich layer. Vanadium is incorporated within the layer composition and was found to act as a lubricating agent during sliding wear. Carbon, also incorporated within the coating, serves to further stabilise the coefficient of friction thereby increasing chemical inertness.

Finally, U.S. patent No. 2012/037493 discloses a coating technology wherein an arc evaporation source is supplied in such manner that the speed of formation of the film is raised, there being induced magnetic lines in the direction of the substrate. The arc evaporation source is provided with: at least one external circumferential magnet disposed in such a manner that the external circumferential magnet surrounds the external circumference of a target and that the direction of magnetisation thereof is in the direction which crosses the surface of the target in an orthogonal manner, and a rear surface magnet disposed on the rear surface side of the target. The rear surface target has a first permanent magnet having a format differing from a ring wherein the polarity thereof is orientated in the same direction as the polarity of the external circumferential magnet, the direction of magnetisation of the rear surface magnet is in the direction crossing the target surface in an orthogonal manner.

There has not been developed thus far a sliding member such as a piston ring having a coating applied by the PVD (physical vapour deposition) process generated by an HiPIMS source wherein such coating is a multilayer composed of a nitride (metal element+nitrogen (N)) and by at least one metal element additional to the nitride which demonstrates excellent performance in relation to fragmentation resistance, wear resistance, and degree of abrasion resistance flowing from the advantageous properties of a low level of internal stress and being free of macroparticles intrinsic to the cathodic arc process.

SUMMARY

The present invention has as an objective a piston ring having a coating composed of a nitride (metal element+nitrogen (N)) and of at least one additional metal element selected from group IIIA of the periodic table.

The present invention furthermore has as an objective a piston ring having excellent properties in relation to wear resistance and fragmentation resistance whilst maintaining an excellent level of abrasion resistance, by virtue of a low level of internal stress and absence of macroparticles.

The objectives of the present invention are achieved by means of a piston ring for an internal combustion engine comprising a metal base whereupon a protective coating is applied to cover at least part of the surface of the base, wherein the coating is composed of at least one phase of nitride produced from at least one metal element and aluminium (Al) and comprises an internal stress of less than 1.2 GPa.

The objectives of the present invention are also achieved by means of a piston ring for an internal combustion engine comprising a metal base whereupon a protective coating is applied to cover at least part of the surface of the base, wherein the coating is composed of a nitride (metal element+(N)) and at least one additional metal element selected from group IIIA of the periodic table, and comprises less than $3 \times 10^4$ macroparticles per square millimeter on the average cross-sectional area of the coating.

The objectives of the present invention are furthermore achieved by means of a piston ring for an internal combustion engine comprising a metal base whereupon a protective multilayer coating is applied, being composed of CrN and CrAlN, wherein the coating comprises less than $3 \times 10^4$ macroparticles per square millimeter of the average cross-sectional area of the coating and is applied by the PVD (physical vapour deposition) process generated by an HiPIMS source.

DETAILED DESCRIPTION

Figure 5:
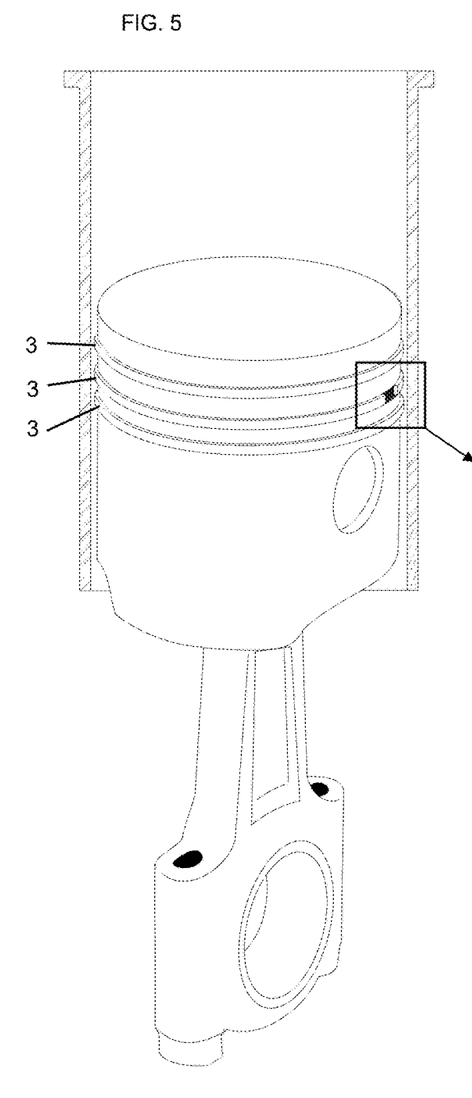
FIG. 5 is a schematic view of a ring of a piston having three rings being an objective of the present invention, within a cylinder liner.
Figure 5A:
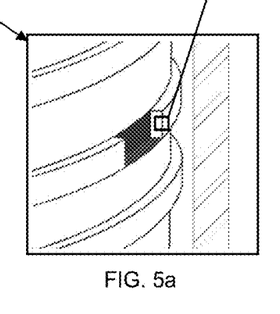
FIG. 5A is a detailed view of a ring of a piston having three rings being an objective of the present invention.
Figure 5B:
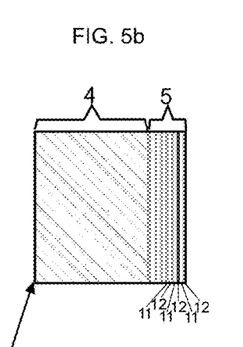
FIG. 5B is a detailed schematic view of the ring illustrated in FIG. 5A, showing the base metal and the innovative coating developed by the inventor.

The present invention relates, in essence, to a piston ring 3 for an internal combustion engine comprising a metal base 4 whereupon a specific new protective coating 5 is applied in such a manner as to cover at least part of the surface of the base 4. More preferably, the sliding member is a compression piston ring.

The metal base 4 of the member is preferably composed of a ferrous metal, such as cast iron or stainless steel, however it is clear that another type of material may be specified if necessary or desirable, provided that the same is technically feasible, without departing from the scope of protection of the invention.

As may be observed in FIGS. 1 to 4 the piston rings 30 already known have a base 40 whereupon a coating 50 may be applied.

Figure 1:
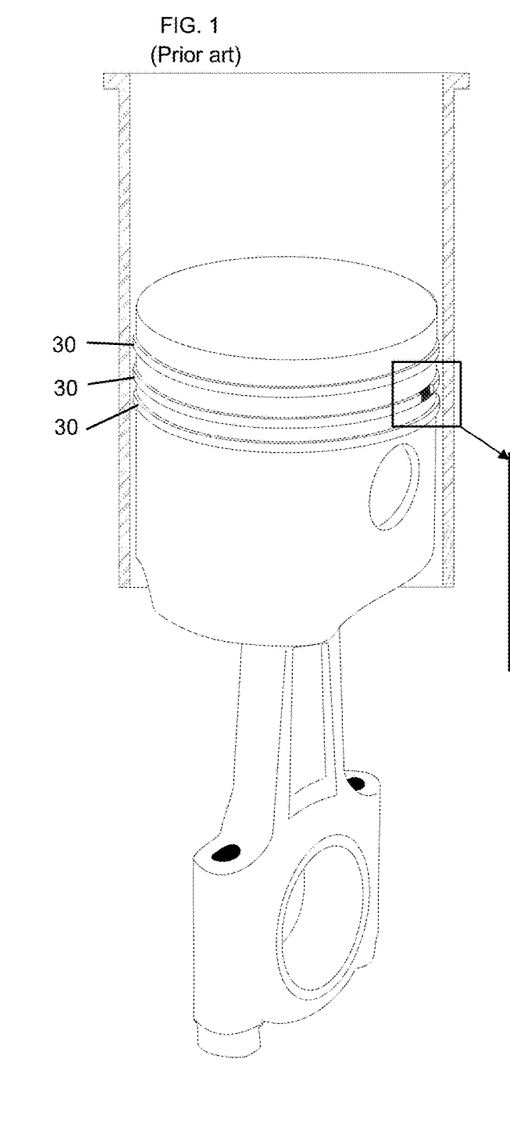
FIG. 1 is a schematic view of a ring of a piston having three rings comprised in the prior art, within a cylinder liner.
Figure 1A:
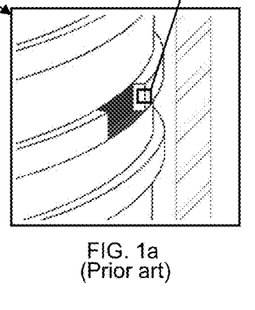
FIG. 1A is a detailed view of one of the rings of the piston illustrated in FIG. 1.
Figure 1B:
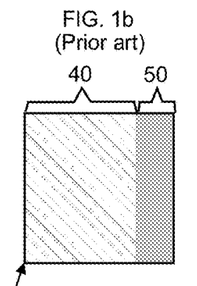
FIG. 1B is a detailed schematic view of the ring illustrated in FIG. 1A, showing the base metal and the ceramic coating.
Figure 2:
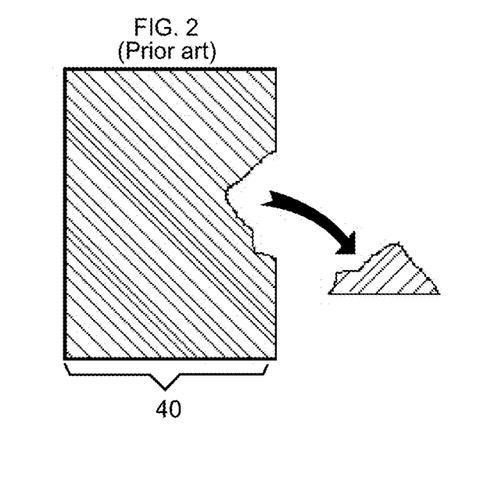
FIG. 2 is a detailed schematic view of the occurrence of fragmentation in a ring comprised in the prior art without any kind of coating.

FIG. 2 shows, schematically, a ring without any type of coating. The lack of a coating to protect the base causes rapid wear and the occurrence of fragmentation.

Figure 3:
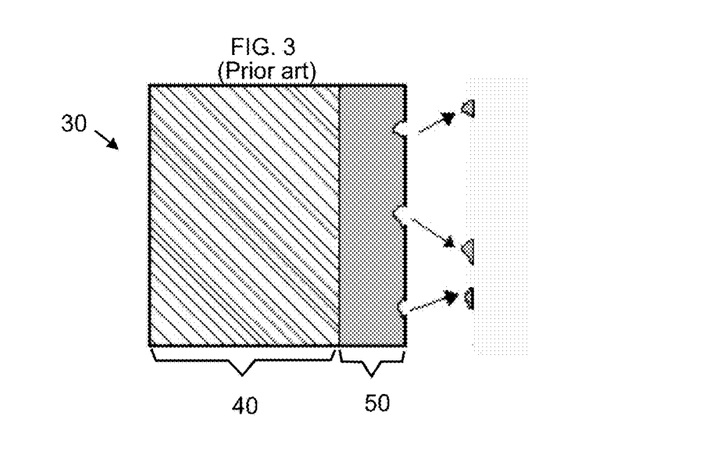
FIG. 3 is a detailed schematic view of the occurrence of fragmentation in a ring comprised in the prior art having an already known ceramic coating.
Figure 4:
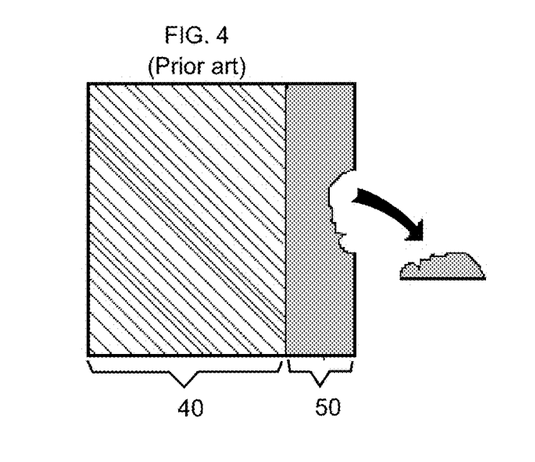
FIG. 4 is another detailed schematic view of the occurrence of fragmentation in a ring comprised in the prior art having the ceramic coating.

FIGS. 3 and 4 show, also schematically, rings having coatings 50 of CrN and/or $CR_2N$. In some engines operating under conditions of extremely high load or having a high combustion pressure level, fragmentation occurs even with such a type of protective coating.

Describing essentially the piston ring 3, which is the objective of the present invention, it comprises a metal base 4 whereupon a protective coating 5 is applied to cover at least part of the surface of the base 4, wherein the coating 5 comprises at least one phase of nitride produced from at least one metal element and aluminium (Al) and comprises an internal stress of less than 1.2 GPa. The hardness of the coating lies between 1500 HV and 2500 HV.

Preferably, the coating 5 is a monolayer structure and the metal element in the nitride phase is from group B of the periodic table, and more particularly composed of CrN, NbN or TiN.

In an alternative embodiment, the coating 5 is formed by a multilayer structure and the surface coating is interposed, originated by superimposing a plurality of sublayers wherein one among such sublayers is composed of CrN. More particularly, the coating 5 comprises at least a first sublayer 11 and at least a second sublayer 12, wherein the first sublayer 11 is composed of at least one metal ceramic and the second sublayer 12 is composed of at least one nitride compound and, additionally, a metal element of group IIIA of the periodic table.

As already known to those skilled in the art, the first sublayer 11 is preferably composed of chromium nitride, including $Cr_2N$ and CrN, or TiN, by virtue of the good tribological properties and overall performance thereof. The chromium nitrides demonstrate an excellent level of abrasion resistance and the TiN may also be used due to its good properties of high oxidation temperature and abrasive wear resistance.

In this embodiment, the most innovative step is the presence of at least a second sublayer 12, composed of at least one nitride compound plus a metal element of group IIIA of the periodic table, being preferably aluminium. More preferably, the second sublayer 12 is composed of a CrN doped with aluminium (Al), ensuring a reduction in internal stress allied with the construction of multilayers at nanometric scale, improving wear and fragmentation resistance. The chromium may be substituted by other elements such as, inter alia, titanium (Ti), molybdenum (Mo), niobium (Nb), vanadium (V).

The coating 5 is applied on the metal base 4 by the PVD (physical vapour deposition) process, generated by an HiP-IMS source, by codeposition on at least two (and preferably four) opposing targets (positioned at a spacing of 180° (or) 90° in relation to each other).

Considering the use of four targets positioned at 90° spacing between each other, there are preferably two Cr targets positioned at 180° in relation to each other, and two targets of CrAl, also positioned at 180° in relation to each other and at 90° in relation to the Cr targets. Solely one type of target is applied for the monolayer structure. For example, four targets of TiAl or CrAl.

The sliding member (that is to say, the piston ring), is positioned on a support base which rotates during the deposition procedure with the objective of alternatively exposing the substrate to the two or four targets. As the substrate rotates, the metal species of both the targets will be deposited and a mixed layer will be formed. The speed of rotation may be modified with the objective of permitting control over the thickness of all sublayers and grain size.

The coating preferably has a thickness between 10 μm and 100 μm, however it may vary freely if necessary or desirable.

The coating 5 also contains, not of necessity, an element selected from the group of which oxygen (O) and carbon (C) form part, in a quantity not exceeding ten percent by weight.

A further optional step of the coating 5 is an intermediate layer principally composed of chromium, nickel or cobalt, disposed between the base 4 and the coating 5.

Also essentially, the piston ring 3, being the objective of the present invention, may be described as comprising a metal base 4 whereupon a protective coating 5 is applied to cover at least part of the external surface of the base 4, wherein the coating 5 is composed of a nitride (metal element+nitrogen (N)) and at least one additional metal element selected from group IIIA of the periodic table, comprising less than $3\times10^4$ macroparticles per square millimeter of the average cross-sectional area of analysis of the material coating. Preferably, the additional metal element is aluminium (Al), however it may be another element from the aluminium IIIA family, such as indium (In), boron (B) and gallium (Ga).

The graphs illustrated in FIGS. 6A to 6D show the analysis of droplets of two versions of the piston ring, which is the objective of the present invention, and the advantages thereof may be easily perceived in comparison with a piston ring belonging to the state of the art having a regular coating of CrN.

Figure 6A:
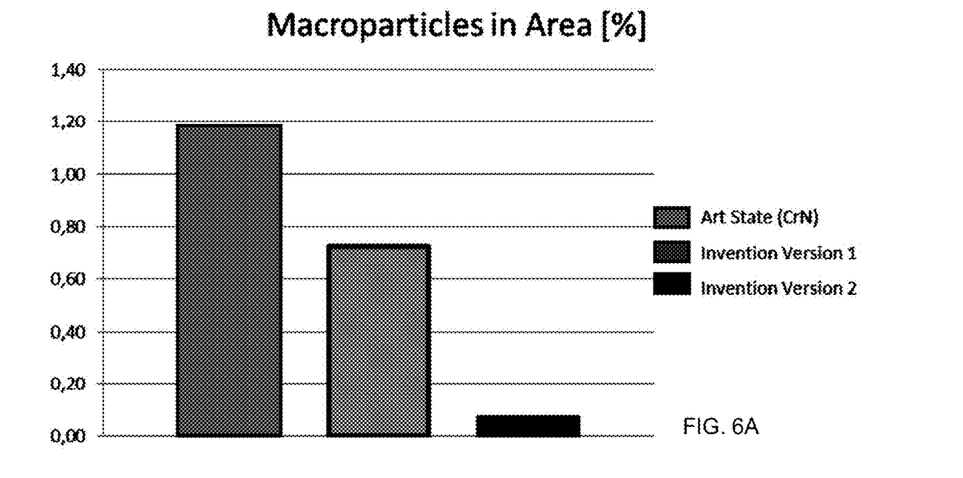
FIG. 6A is a graph of the percentage of macroparticles/droplets in the area of the coating, comparing the piston ring of the prior art and of the present invention.

The graph in FIG. 6A clearly shows the reduction in the area of macroparticles/droplets of the two versions of the present invention (respectively approximately 0.08% (version 2 of the invention) and approximately 0.75% (version 1 of the invention)) when compared with the almost 1.2% of the CrN ring of the prior art.

Figure 6B:
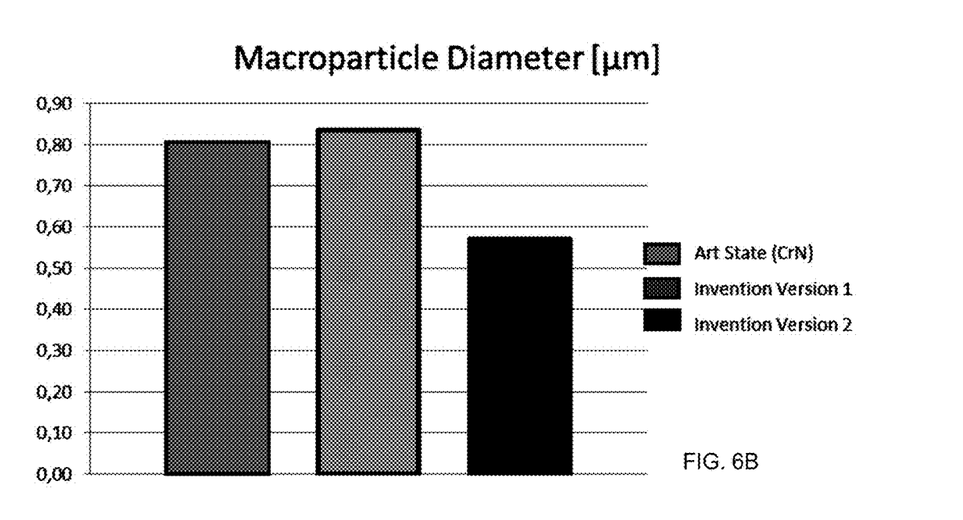
FIG. 6B is a graph of the diameter of macroparticles/droplets in the coatings of the piston ring of the prior art and of the present invention.

In an identical manner, the graph in FIG. 6B shows the reduction in diameter of the macroparticles/droplets (in μm) of version 2 of the present invention (approximately 0.57 μm against approximately 0.81 μm of a CrN ring of the prior art). In this specific analysis, version 1 of the present invention does not demonstrate advantages in relation to the ring of the prior art, having a marginally greater diameter (approximately 0.82 μm).

Figure 6C:
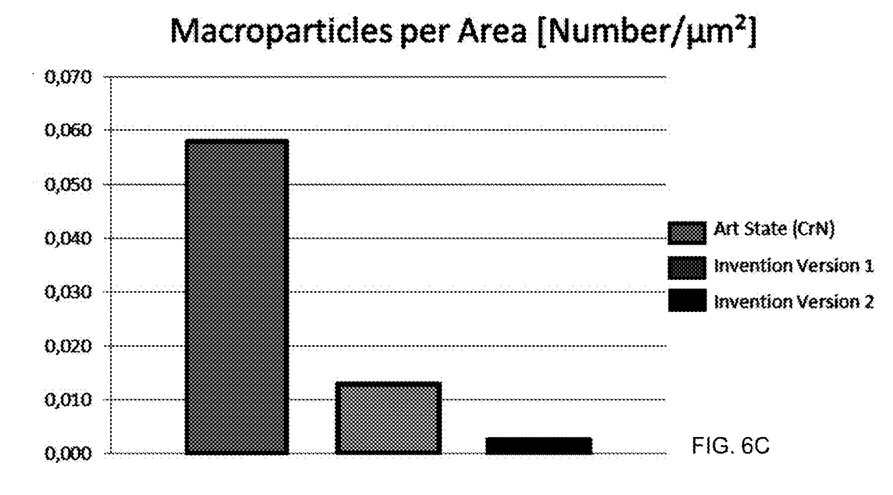
FIG. 6C is a graph of the number of macroparticles/droplets per area of the coating, comparing the piston ring of the prior art and of the present invention.

The graph in FIG. 6C shows the reduction in the ratio of the number of macroparticles/droplets to the area of the coating (in numbers of droplets per μm2). Whereas the coating of CrN of the prior art shows that ratio as being approximately 0.058, versions 1 and 2 of the present invention show much smaller values, respectively approximately 0.014 and 0.003.

Figure 6D:
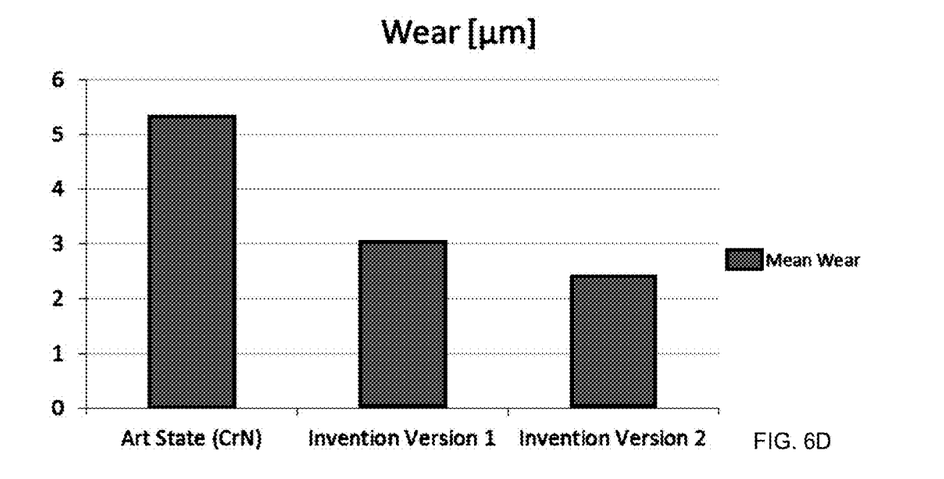
FIG. 6D is a graph of the average wear of the coatings of the piston ring of the prior art and of the present invention.

Finally, the graph in FIG. 6D relates to the principal wear (in μm), which is reduced from approximately 5.3 μm on a ring coated with regular CrN to 3 μm (version 1 of the invention) and to 2.5 μm (version 2 of the invention).

A scratch test was executed to analyse the performance of the piston ring 3 of the present invention in comparison with a piston ring having a regular coating of CrN. The scratch test, schematically illustrated in FIG. 7, was executed on an Atlas apparatus in conformity with the standard ASTM C 1624 05.

Figure 7:
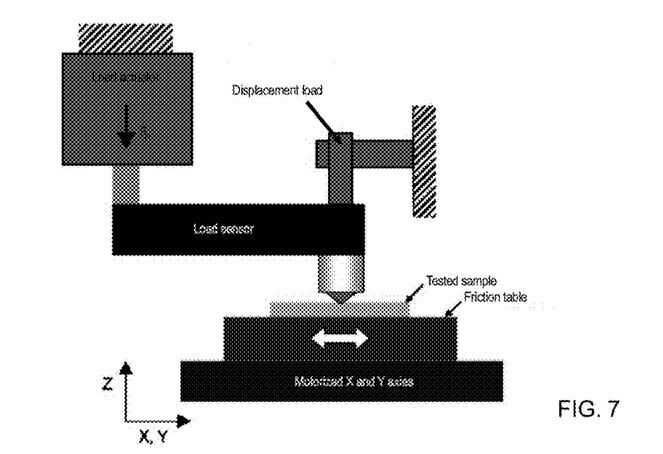
FIG. 7 is a schematic view of the Atlas apparatus for the execution of the scratch test, in accordance with the standard ASTM C 1624 05.

In such a test, a stylus is forced to slide over a sample having a coating which must be tested whilst a load $F_N$ is applied perpendicularly to the displacement. Whilst the stylus slides, the load applied is gradually increased until delamination of the coating occurs. Here the advantages of the coating 5 of the ring object of the present invention are clearly observed.

Figure 8:
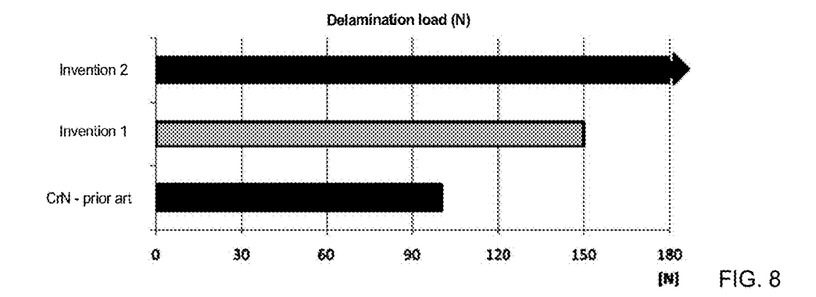
FIG. 8 is a comparative graph of the delamination load supported by the ring of the prior art and of the present invention coated with CrN.
Figure 9:
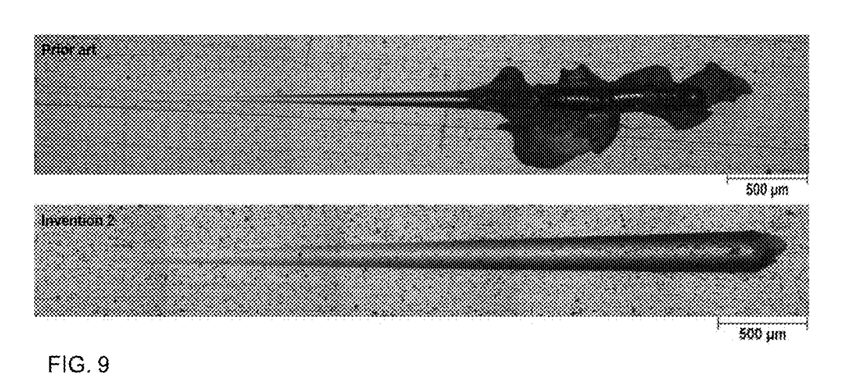
FIG. 9 shows two images comparing the appearance of the coating of the ring of the prior art with the ring of the present invention, following the scratch test.

The graph illustrated in FIG. 8, which illustrates the delamination load (in N) supported by the coating during displacement of the stylus, shows that the ring coated with CrN of the prior art supported a load of approximately 100 N prior to delamination.

In terms of comparison, version 1 of the present invention supported 150N prior to delamination (approximately 50% more in relation to the ring of the prior art). Version 2 of the invention performed even better, by virtue that it supported a load of 180N (the maximum capacity of the equipment) without delamination.

Having described examples of preferred embodiments, it shall be understood that the scope of the present invention embraces other possible variations and is solely limited by the content of the claims appended hereto, potential equivalents being included therein.

The invention claimed is:

1. A piston ring for an internal combustion engine comprising: a metal base and a protective coating disposed on the base to cover at least part of a surface of the base, wherein the protective coating has a composition including at least one nitride phase having at least one metal element and aluminium (Al), and an internal stress of less than 1.2 GPa; and wherein the protective coating has less than $4\times10^4$ macroparticles per square millimeter of an average cross-sectional area of the coating.

2. The piston ring according to claim 1, wherein the at least one metal element in the nitride phase is from group B of the periodic table that comprises aluminium (Al), boron (B) and gallium (Ga).

3. The piston ring according to claim 1, wherein the protective coating has a multilayer structure including a layer composed of the at least one nitride phase having the at least one metal element doped with said aluminium, and another layer composed of a metal nitride.

4. The piston ring according to claim 1, wherein the nitride phase has a composition including at least one of CrN, TiN and NbN.

5. The piston ring according to claim 1, wherein the coating includes a multilayer structure and the at least one nitride phase is interposed in the multilayer structure via superimposing a plurality of sublayers, and wherein at least one of the plurality of sublayers is composed of CrN.

6. The piston ring according to claim 1, wherein the coating is a physical vapour deposition layer deposited via a high-power impulse magnetron sputtering (HiPIMS) source.

7. The piston ring according to claim 1, wherein said macroparticles have a diameter of less than 0.9 μm.

8. The piston ring according to claim 1, wherein the coating includes an element selected from the group of elements in the periodic table of which oxygen (O) and carbon (C) belong, in a quantity of not exceeding ten percent by weight.

9. The piston ring according to claim 1, wherein the coating has a hardness between 1500 HV and 2500 HV.

10. The piston ring according to claim 1, wherein the coating has a thickness between 10 μm and 100 μm.

11. The piston ring according to claim 1, further comprising an intermediate layer, principally composed of chromium, nickel or cobalt, wherein the intermediate layer is disposed between the base and the coating.

12. The piston ring according to claim 1, wherein the metal base is a compression ring.

13. The piston ring according to claim 1, wherein the protective coating is free of macroparticles.

14. A piston ring for an internal combustion engine comprising: a metal base and a protective coating disposed on the base to cover at least part of an external surface of the base, wherein the coating is multilayer including a nitride phase and a phase of a chromium nitride with a metal element selected from group IIIA of the periodic table, and wherein the coating is substantially free of macroparticles and has an internal stress of less than 1.2 GPa and a periodicity of the multilayers of the coating is less than 10 nm.

15. The piston ring according to claim 14, wherein the coating has a multilayer structure including a layer of the nitride phase and a layer of the phase of chromium nitride with the metal element arranged one on top of the other.

16. The piston ring according to claim 14, wherein the nitride phase is composed of CrN, NbN or TiN.

17. The piston ring according to claim 14, wherein the metal element of the phase of the chromium nitride is aluminium (Al).

18. The piston ring according to claim 14, wherein the coating is a physical vapour deposition coating disposed via an HiPIMS source.

19. The piston ring according to claim 14, wherein the coating has a hardness between 1500 HV and 2500 HV.

20. The piston ring according to claim 14, wherein the coating has a thickness between 10 μm and 100 μm and is free of macroparticles.

21. A piston ring for an internal combustion engine comprising:
  a metal base and a physical vapour deposition protective coating disposed on the metal base;
  the coating having a composition including CrAlN and macroparticles in a quantity ranging between $5 \times 10^2$ and $3 \times 10^4$ macroparticles per square millimeter of an average cross-sectional area of the coating, wherein the coating is disposed on the base via an HiPIMS source.

* * * * *